Patented Aug. 14, 1934

1,970,143

UNITED STATES PATENT OFFICE 1,970,143

PROCESS OF REFINING GASOLINE WITH ZINC CHLORIDE

Franklin E. Kimball, Los Angeles, Calif.

No Drawing. Application September 15, 1933, Serial No. 689,680

1 Claim. (Cl. 196—36)

This invention relates to methods of refining gasoline employing that action ensuing from bringing hot gasoline vapors into contact with metallic salts to induce syntheses of hydrocarbons from certain constituents of the vapors. The object of the invention is to provide methods more expeditious and cheaper than processes whose metallic salts decompose upon effecting such contact.

In various processes previously employed for refining hot gasoline vapors with aqueous solutions of metallic salts, losses of valuable gasoline constituents occur as condensate in the treating solution on account of tight emulsions formed with gelatinous substances separating from the solution as a result of decomposition of the salts employed. Such gelatinous emulsions prevent valuable gasoline constituents from evaporating from the involved emulsion when it has risen to the surface of the treating solution. The pressure, being diminished when gasoline condensate has risen to the surface of the treating solution, would ordinarily permit it to vaporize were it not for the restraining influence of the gelatinous substances present in the emulsion.

Instead of incurring the losses effected by such emulsions, I employ the use of the presence of hydrochloric acid thereby effecting prevention of decomposition of zinc chloride which I employ in the presence of hydrochloric acid to induce syntheses of hydrocarbons from certain constituents of the hot gasoline vapors. I pass hot gasoline vapors into contact with a hot maintained primary treating mixture of water, calcium chloride and magnesium chloride thereby liberating hydrochloric acid gas from the treating mixture, separate and withdraw the vapors from the primary treating mixture, pass the withdrawn vapors into contact with a hot maintained secondary treating mixture of water and zinc chloride thereby effecting syntheses of hydrocarbons from certain constituents of the vapors induced by aforesaid hydrochloric acid, separate and withdraw the vapors from the secondary treating mixture, supply ammonia to the withdrawn vapors, pass the ammoniacal vapors into contact with a hot maintained tertiary treating mixture of water and calcium chloride thereby liquefying products of aforesaid syntheses of hydrocarbons, separate and withdraw the vapors from the tertiary treating mixture and cool and condense the withdrawn vapors thereby forming gasoline. The primary treating mixture of water, calcium chloride and magnesium chloride yields crystalline magnesium oxide without the formation of gasoline emulsion to incur losses. Evolved hydrochloric acid gas resulting from hydrolysis of the primary treating mixture is thereby yielded to the vapors and it in turn prevents decomposition of the secondary treating mixture. Thereafter the hydrochloric acid gas is transformed into ammonium chloride and is extracted from the vapors by the tertiary treating mixture without decomposition resulting.

I will hereinbelow describe a preferred embodiment of my improvements in processes of refining gasoline vapors as an example of a practical illustration thereof. It is to be understood that my invention is not limited nor restricted to the precise mixtures, concentrations, quantities, proportions, temperatures, pressures nor metallic salts employed in the operation of such an illustrative process as is hereinbelow thus described as being an example portraying my improvements.

In the application of my process steam and hot gasoline vapors derived from heating mineral oil are continuously passed into the bottom of a suitable bubble-tower and are continuously withdrawn from it at the top thereof. Hot mixtures of water, calcium chloride and magnesium chloride are continuously supplied to the top of said bubble-tower and are continuously withdrawn from it from the bottom thereof. Within the bubble-tower the vapors are brought into contact with the treating mixture by bubbling therethrough in a series of superimposed pans such as are well-known in the art of treating hot gasoline vapors. The vapors from off of each pan below pass into the pan above at a point beneath the surface of the liquid therein. The treating mixture from off of the top of each pan above passes into the pan below at a point beneath the surface of the liquid therein.

The treating of the hot gasoline vapors in this primary bubble-tower with this primary treating mixture of water, calcium chloride and magnesium chloride is controlled by manipulation of the amounts of the various constituents of the treating mixtures supplied to the top of the bubble-tower. It is aimed at all times to supply a minimum of at least thirty pounds of calcium chloride in aqueous solution for each barrel of gasoline being supplied for treatment. The treating mixture containing this thirty pounds of calcium chloride contains at least two pounds of magnesium chloride. Additional amounts of magnesium chloride are also fed in the treating mixtures in such quantities as are sufficient to offset such amounts of magnesium chloride as are consumed by the hydrolysis incurred in the application of the treatment to the vapors. Additional amounts of water are also fed in the treating mixtures in such quantities as are sufficient to offset the amounts of water being vaporized in the application of the treatment. By the aforesaid manipulations of the amounts of the various ingredients of the treating mixtures which are being supplied to the top of the primary bubble-tower the resulting composition of the treating mixture which is being withdrawn from the bottom of the primary bubble-tower is thereby carefully maintained within the proportions of approximately 30 to 40 per cent of water, 55 to 65 per cent of calcium chloride and 3 to 5 per cent of magnesium chloride. The temperature of this exit flow from the primary bubble-tower is also carefully maintained at approximately 370 to 430 degrees Fahrenheit by means of manipulations of temperature and pressure of the hot gasoline vapors which are being subjected to treatment.

The withdrawn vapors from off of the top of the primary bubble-tower are then continuously supplied to the bottom of a secondary suitable bubble-tower and are continuously withdrawn from it at the top thereof. Hot mixtures of water and zinc chloride are continuously supplied to the top of said secondary bubble-tower and are continuously withdrawn from it at the bottom thereof. Within the secondary bubble-tower the vapors are brought into contact with the secondary treating mixture by bubbling therethrough in a series of superimposed pans such as are well-known in the art of treating hot gasoline vapors. The vapors from off of the top of each pan below pass into the pan above at a point beneath the surface of the liquid therein. The secondary treating mixture from off of the top of each pan above passes into the pan below at a point beneath the surface of the liquid therein.

The treating of the hot gasoline vapors in this secondary bubble-tower with this secondary treating mixture of water and zinc chloride is controlled by manipulations of the amounts of the ingredients of the secondary treating mixtures being supplied to the top of the secondary bubble-tower. It is aimed at all times to supply a minimum of at least thirty pounds of zinc chloride in aqueous solution for each barrel of gasoline being supplied for treatment. Additional amounts of water are supplied in the secondary treating mixtures in such quantities as are sufficient to offset the amounts of water being vaporized in the application of the treatment to the hot gasoline vapors. By the aforesaid manipulations of the amounts of both ingredients of the secondary treating mixtures which are being supplied to the top of the secondary bubble-tower the resulting composition of the secondary treating mixture which is being withdrawn from the bottom of the secondary bubble-tower is thereby carefully maintained within the proportions of approximately 20 to 30 per cent of water and 70 to 80 per cent of zinc chloride. The temperature of this exit flow from the secondary bubble-tower is also carefully maintained at approximately 350 to 400 degrees Fahrenheit by means of manipulations of temperature and pressure of the hot gasoline vapors which are being subjected to treatment.

The withdrawn vapors from off of the top of the secondary bubble-tower are next continuously supplied to the bottom of a tertiary suitable bubble-tower and are continuously withdrawn from it at the top thereof. Before supplying them to the said tertiary bubble-tower they are carefully neutralized by continuously supplying gaseous ammonia into admixture with the withdrawn vapors from off of the top of the secondary bubble-tower. Hot mixtures of water and calcium chloride are continuously supplied to the top of said tertiary bubble-tower and are continuously withdrawn from it at the bottom thereof. Within the tertiary bubble-tower the vapors are brought into contact with the tertiary treating mixture by bubbling therethrough in a series of superimposed pans such as are well-known in the art of treating hot gasoline vapors. The vapors from off of the top of each pan below pass into the pan above at a point beneath the surface of the liquid therein. The tertiary treating mixture from off of the top of each pan above passes into the pan below at a point beneath the surface of the liquid therein. The tertiary treating mixture which is withdrawn from the tertiary bubble-tower contains ammonium chloride and hydrocarbon liquid containing gums which have been formed by the catalytic action of the zinc chloride in the secondary bubble-tower followed by the partial cooling and partial condensing of the withdrawn vapors as a result of being supplied into contact with the tertiary treating mixture of water and calcium chloride in the tertiary bubble-tower.

The treating of the hot gasoline vapors in this tertiary bubble-tower with this tertiary treating mixture of water and calcium chloride is controlled by manipulations of the amounts of the ingredients of the tertiary treating mixtures being supplied to the top of the tertiary bubble-tower. It is aimed at all times to supply a minimum of at least thirty pounds of calcium chloride in aqueous solution for each barrel of gasoline being supplied for treatment. Additional amounts of water are supplied in the tertiary treating mixtures in such quantities as are sufficient to offset the amounts of water being vaporized in the application of the treatment to the hot gasoline vapors. By the aforesaid manipulations of the amounts of both ingredients of the tertiary treating mixtures which are being supplied to the top of the tertiary bubble-tower the resulting composition of the tertiary treating mixture which is being withdrawn from the bottom of the tertiary bubble-tower is thereby carefully maintained within the proportions of approximately 35 to 45 per cent of water and 50 to 60 per cent of calcium chloride. The temperature of this exit flow from the tertiary bubble-tower is also carefully maintained at approximately 275 to 325 degrees Fahrenheit by means of manipulations of temperature and pressure of the hot gasoline vapors which are being subjected to treatment.

The withdrawn vapors from off of the top of the tertiary bubble-tower are then continuously cooled and condensed thereby forming gasoline.

Although I have hereinabove shown and described only one process of refining gasoline embodying my invention, it is to be understood that various changes and modifications may be made in making the application of my improvements to processes of refining gasoline without departing from the spirit of the invention and the spirit and scope of the appended claim.

I claim:

A method of refining gasoline comprising heating mineral oil thereby forming hot gasoline vapors, passing the vapors into contact with a hot maintained primary treating mixture of water, calcium chloride and magnesium chloride thereby liberating hydrochloric acid gas from the primary treating mixture, separating and withdrawing the vapors from the primary treating mixture, passing the withdrawn vapors into contact with a hot maintained secondary treating mixture of water and zinc chloride thereby effecting syntheses of hydrocarbons from certain constituents of the vapors induced by aforesaid hydrochloric acid gas, separating and withdrawing the vapors from the secondary treating mixture, supplying ammonia to the withdrawn vapors, passing the ammoniacal vapors into contact with a hot maintained tertiary treating mixture of water and calcium chloride thereby liquefying products of aforesaid syntheses of hydrocarbons, separating and withdrawing the vapors from the tertiary treating mixture and cooling and condensing the withdrawn vapors thereby forming gasoline.

FRANKLIN E. KIMBALL.